(12) United States Patent
Bellifemine et al.

(10) Patent No.: US 6,196,714 B1
(45) Date of Patent: Mar. 6, 2001

(54) INFRARED THERMOMETER COMPRISING OPTICAL AIMING SYSTEM

(75) Inventors: Francesco Bellifemine; Vincenzo Rudi, both of Varese (IT)

(73) Assignee: La Tecnica S.r.l. (IT)

( * ) Notice: Subject to any disclaimer, the term of this patent is extended or adjusted under 35 U.S.C. 154(b) by 0 days.

(21) Appl. No.: 09/214,252

(22) PCT Filed: Jul. 4, 1997

(86) PCT No.: PCT/EP97/03531

§ 371 Date: Dec. 30, 1998

§ 102(e) Date: Dec. 30, 1998

(87) PCT Pub. No.: WO98/01730

PCT Pub. Date: Jan. 15, 1998

(30) Foreign Application Priority Data

Jul. 5, 1996 (IT) ................................. MI96A1399

(51) Int. Cl.[7] .............. G01K 1/16; G01K 1/08; G01J 5/04
(52) U.S. Cl. ............. 374/121; 374/120; 374/130; 374/124; 374/161; 374/208
(58) Field of Search ...................... 374/121, 120, 374/130, 131, 132, 124, 161, 191, 208

(56) References Cited

U.S. PATENT DOCUMENTS

| | | | | |
|---|---|---|---|---|
| 4,773,766 | * | 9/1988 | Nagasaka et al. | 374/131 |
| 5,823,678 | * | 10/1998 | Hollander et al. | 374/121 |
| 5,839,829 | * | 11/1998 | Litvin et al. | 374/121 |
| 6,019,507 | * | 2/2000 | Takaki | 374/161 |
| 6,102,564 | * | 8/2000 | Egawa | 374/129 |
| 6,109,782 | * | 8/2000 | Fukura et al. | 374/131 |

OTHER PUBLICATIONS

Abstract of WO94/20023, Oct. 16, 1999.

* cited by examiner

Primary Examiner—G. Bradley Bennett
Assistant Examiner—G. Verbitsky
(74) Attorney, Agent, or Firm—Hedman & Costigan, P.C.

(57) ABSTRACT

A clinical thermometer is described, based on the measurement of the infrared radiation emitted by the patient, in which the body temperature of the patient in obtained in a non-invasive way and (normally) without any contact between the thermometer and the patient. During measurement of the temperature, the thermometer (1) is put at a preset distance (d) from the body of the patient, a distance which is normally determined by an optical aiming system consisting of two converging rays of light (5). A thermometer according to the invention may be used to obtain the temperature of the patient also by contact.

12 Claims, 3 Drawing Sheets

INFRARED THERMOMETER COMPRISING OPTICAL AIMING SYSTEM

SCOPE OF INVENTION

The invention consists of an infrared clinical thermometer which, during measurement of the body temperature of the patient, is put at a preset distance from the patient.

PRIOR ART

Traditional mercury thermometers are well known and still widely used for both medicine and veterinary purposes, even though they require excessively long times (4–5 minutes) to yield a response, and they are not always easy to read or very precise.

Fast-reading mercury thermometers have been developed, Which, however, have not been very successful on the market because they are costly and brittle. Digital thermometers, albeit representing an undoubted technical advance on clinical mercury thermometers, are not without certain drawbacks and limitations deriving basically from their response time, not less than 30–60 seconds, which is (or may be) too long when it is necessary to obtain the body temperature of particularly restless new-born, babies, or else of animals.

Infrared clinical thermometers have recently come on the market, which comprise basically a sensor that detects in a very short time (2–3 seconds) the intensity of the infrared radiation emitted by a preset point of the body of the patient and a logic that processes the signal emitted by the sensor to determine the body temperature of the patient and to show it on a display, normally of a digital type, forming part of the thermometer itself.

As temperature measuring point, the ear drum membrane is normally used, which is located immediately near the hypothalamus (i.e., the gland which regulates body temperature) and which is normally reached by inserting a probe connected to the sensor into the auditory canal. This probe forms a single piece with the sensor and may protected by a cap which is preferably interchangeable.

These infrared thermometers present, however, certain drawbacks. In the first place, measuring the temperature at the ear drum cannot certainly be considered "non-invasive", since the probe anyway causes a certain discomfort to the patient. In addition, for obvious hygienic reasons it is necessary (or at least very advisable) to apply an interchangeable protective cap to the probe, or else clean the probe after each measuring. These are all things that are uncomfortable and inconvenient, especially in hospitals.

Finally, the precision of the thermometer reading may be impaired by a set of factors that are not always exactly foreseeable or assessable, such as, for example, an imperfect positioning of the end of the probe and/or the presence of wax in the auditory canal, etc. On the other hand, the infrared sensors currently available an the market are of such a size that they cannot be introduced into the auditory canal of the patient, and hence it is essential to use a probe (containing a wave-guide having suitable characteristics) which "conveys" to the sensor the infrared radiation emitted by the ear drum membrane, at the same time preventing the sensor from being affected by the infrared radiation emitted by the surrounding areas, for example, the auricular region.

Remote infrared measuring devices are already known.

WO-A-92/02792 shows a remote temperature difference measuring device comprising a casing including at least a sensor for sensing the infrared radiation emitted by a surface, a measuring circuit comparing the value currently measured by the sensor with a value stored into a memory circuit and display means to display the algebraic difference between said two values; the measuring device further comprising means for positioning said sensor, including a pair of sources of conical light rays positioned outside said casing. and inclined with respect to the axis thereof: when the conical light rays are superimposed, the sensor is at a preset distance from the surface and is perpendicular thereto.

The predominant aim and use of WO-A-92/02792 is for measuring a difference of temperature: only if the stored value of temperature is known and/or it is constant, can WO-A-92/02792 be used for measuring a temperature by algebraically adding the known value to the difference of temperature read on the display means.

GB-A-2,291,498 shows a remote temperature detector, including a lens for focusing radiation from the heat source on a sensor belonging to the detector and a laser aiming system including a laser beam splitter assembly and a mirror: the two components of the split laser beam converge on the focal point of the sensor lens.

The laser beam splitter assembly acts as a laser beam splitter and as a deflecting means; the laser source, the laser beam splitter assembly and the mirror are positioned outside the casing of the detector shown by GB-A-2,291,498. Subject of the present invention is an infrared clinical thermometer that is exempt the limits and disadvantages presented by infrared thermometers of a known type.

SUMMARY OF INVENTION

The subject of the present invention is an infrared thermometer comprising at least a sensor which detects infrared radiation and a logical unit which processes the signal emitted by the sensor and drives display means for displaying the body temperature of the patient.

During measurement of patient's temperature, the sensor is put at a preset distance from the body of the patient, determined preferably by means of an optical aiming system belonging to the thermometer and comprising means for generating a pair of light rays and optical means that cause the aforesaid light rays to converge in a preset point, whose distance from the sensor is equal to the preset distance, the optical means being different from the generating means.

The sensor, the logical unit, the display means, the means for generating the pair of light rays and the optical means are positioned inside the casing of the thermometer.

LIST OF FIGURES

The invention will now be described in greater detail with reference to an embodiment thereof, which is presented purely for illustrative reasons and in no way exhausts the possibilities. The invention in shown in the attached figures, where:

FIG. 3 presents a schematic flow chart illustrating the operation of the logical unit of FIG. 1. In the attached figures, the corresponding elements are identified by means of the same numerical references.

DETAILED DESCRIPTION

Figure 1:
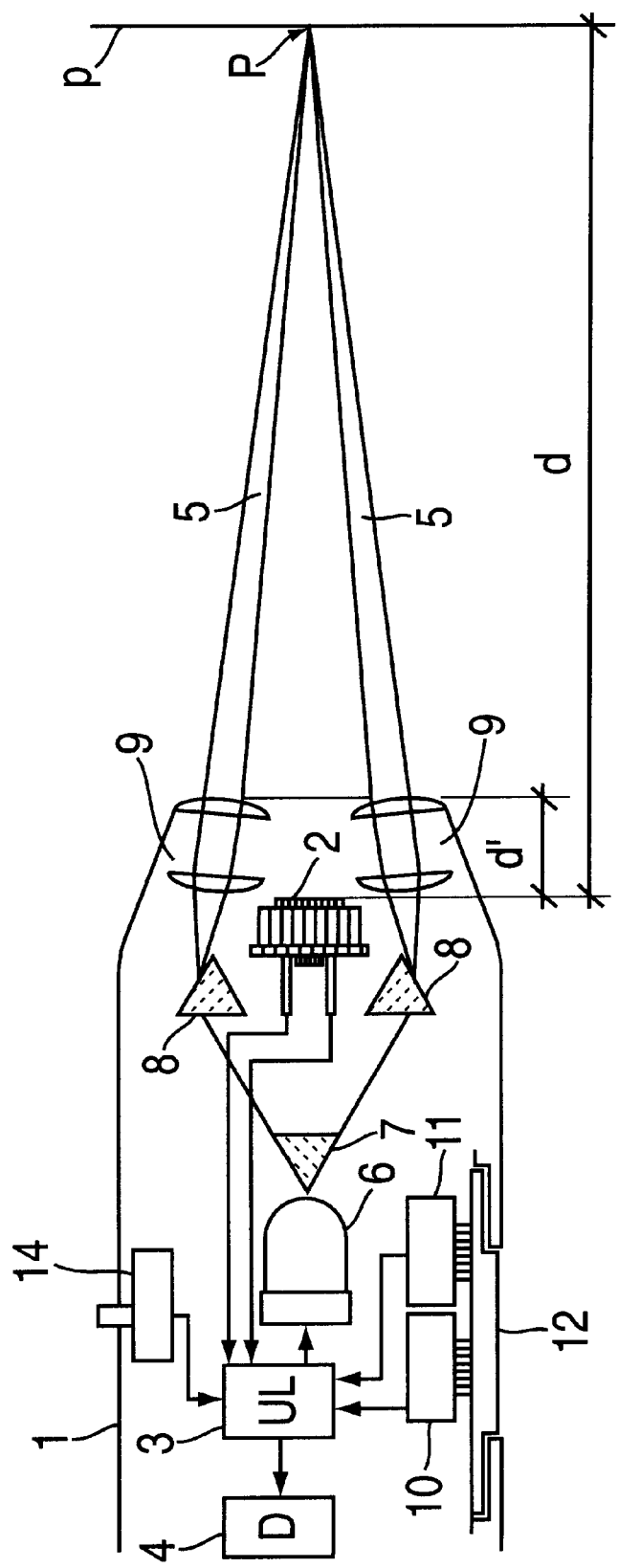
FIG. 1 shows a block diagram of a thermometer according to the invention, including a first embodiment of the optical aiming system.

FIG. 1 shows a block diagram of a thermometer according to the invention. In the figure are visible the outer casing of the thermometer (1), the sensor (2) for detecting the infrared radiation emitted by the body (p) of the patient, the logical unit (3) which receives and processes the signal emitted by the sensor (2) to determine the body temperature of the patient, which is displayed on a display (4) preferably, but not necessarily of a digital type—and an optical aiming system which reveals visually a preset distance (d) generating a pair of light rays which converge in a preset point (P), the distance of which from the sensor (2) corresponds to the aforesaid preset distance (d).

An infrared thermometer is not described herein since it is already known (for example, from the published international patent application No. WO 94/20023). It will suffice to recall that, given the same body temperature of the patient, the amount of infrared radiation detected by the sensor (2)—and, consequently the amplitude of the signal emitted by the sensor (2)—is a function, among other things, of the distance between the sensor (2) and the body (p) of the patient, and that the body temperature detected by the thermometer (1) is in turn a function of the signal emitted by the sensor (2).

The thermometer (1) is (or may be) calibrated in a way that is in itself known to measure with the desired precision the body temperature of a patient when the sensor (2) is put at the preset distance (d) from the body (p) of the patient.

Consequently, the thermometer (1) is able to detect the body temperature of the patient with a precision that depends also on the precision with which the condition of placing the sensor (2) at the distance (d) from the body (p) of the patient is respected.

The optical aiming system belonging to the thermometer object of the present invention, which generates a pair of light rays (5) converging in the point (P) at a distance (d) from the sensor (2), is a simple, but effective, solution to the problem of determining rapidly and with acceptable precision whether the sensor (2) of the thermometer (1) is correctly positioned at the distance (d) from the body (p) of the patient.

An optical aiming system according to the invention comprises means for generating the pair of light rays (5) that converge in the preset point (P) and optical means (9) that cause the aforesaid light rays (5) to converge in the preset point (P).

In the embodiment shown in FIG. 1, the means for generating the pair of light rays (5) include a light source (6), means (7) which split the light ray emitted by the source (6), and means (8) that deflect the light rays coming out of the splitting means (7) to make them converge in the preset point (P).

In FIG. 1 the means for splitting the light rays (7) and the means for deflecting the light rays (8) consist of optical prisms, but, without departing from the scope of the invention, the splitting means (7) may consist of an optical prism, and the deflecting means (8) may consist of mirrors.

In the example of embodiment here illustrated each one of the optical means (9) that cause the aforesaid light rays (5) to converge in the preset point (P) consists of a pair of plane-convex lenses, but without departing from the scope of the invention it is possible to use biconvex lenses or other equivalent optical means. In order to measure the body temperature of the patient, the operator pushes a first push-button (10) belonging to the thermometer (1), which activates the optical aiming system—in FIG. 1, the first push-button (10) activates, via the logical unit (3), the light source (6)—,displaces the thermometer (1) until the point (P) where the light rays (5) converge is positioned on the patient's skin, and pushes a second push-button (11) belonging to the thermometer (1), which activates the thermometer 1—in FIG. 1, the second push-button (11) drives the logical unit (3). The optical means (9) illustrated in FIGS. 1 and 2 cause each of the two light rays (5) to be convergent so that they become point like only in the preset point (P). In this case, if the sensor (2) of the thermometer (1) is at the preset distance (d) from the patient's body (p), the two rays (5) coincide in point (P); otherwise, the operator sees on the body of the patient two distinct luminous areas, one for each of the light rays (5), which are reduced in width and get closer to one another as the distance between the sensor (2) and the body (p) of the patient gets closer to the preset value (d).

In fact, the light rays (5) reach the patient's skin before they met if the thermometer (1) is too close to the body (p) of the patient; they reach the patient's skin after crossing one another and then diverging again if the thermometer (1) is too far from the body (p) of the patient.

In In the embodiment described here the push-buttons (10) and (11) have a different mechanical response (i.e., they require a different pressure to be activated) and are operated by the operator through a single button (12); however, without departing from the scope of the invention, the push-buttons (10) and (11) may be operated directly by the operator, or a "double-action" push-button combining the functions of the push-buttons (10) and (11) may be used.

Figure 2:
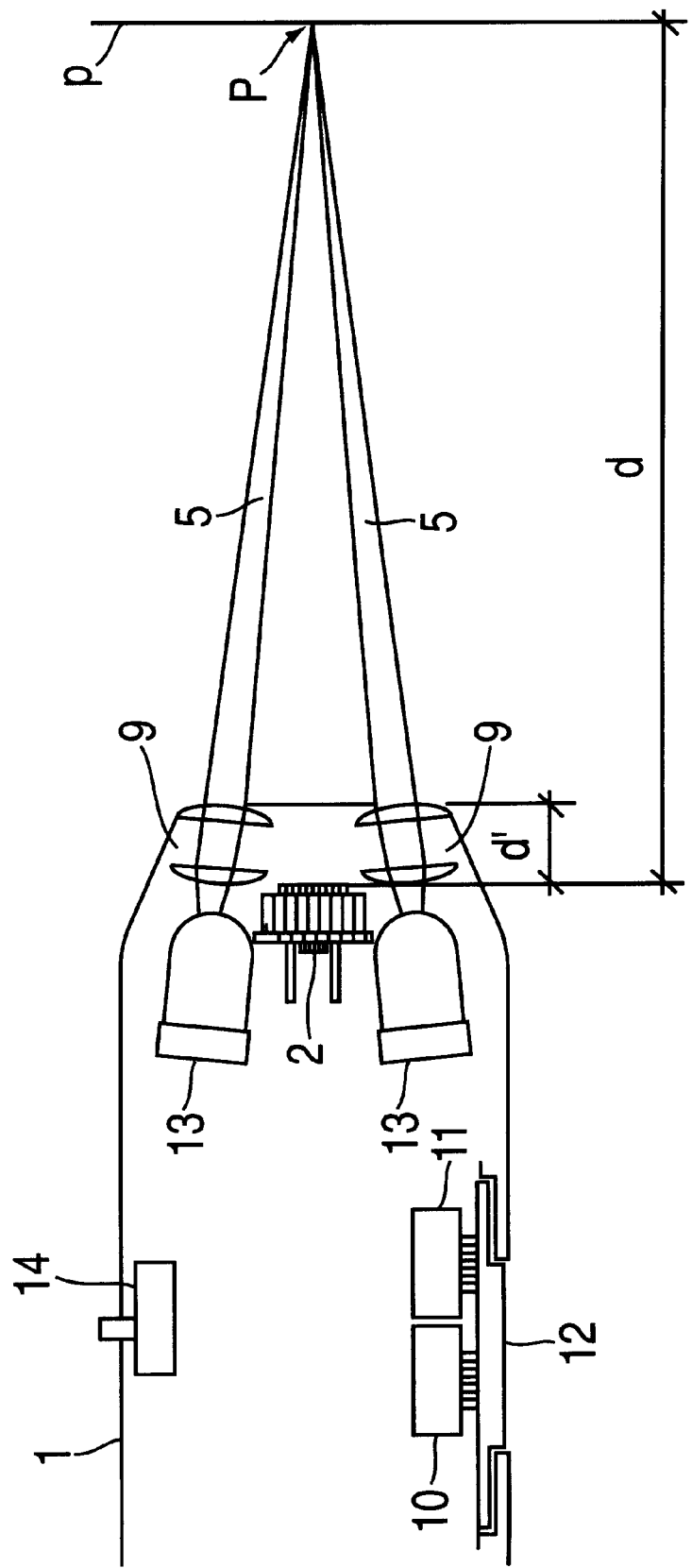
FIG. 2 shows a schematic presentation of a second embodiment of the optical aiming system of FIG. 1.

FIG. 2 is a schematic representation of a second embodiment of the optical aiming system, where the means for generating said pair of converging light rays (5) include a pair of light sources (13), equal to one another, located at the sides of the sensor (2) and inclined with respect to the axis of longitudinal symmetry of the thermometer (1), so as to cause the light rays emitted by the light sources (13) to converge in the preset point (P).

According to one of its possible embodiments, the thermometer (1) may be used also to detect the body temperature of the patient by contact, i.e., by resting on the body (p) of the patient the end of the thermometer (1) corresponding to the window made of material that is transparent to infrared radiation (not explicitly indicated in the figures) behind which the sensor (2) is located. The distance (which is known) between the window positioned at the end of the thermometer (1) and the sensor (2) is indicated in FIGS. 1 and 2 by (d').

The said thermometer (1) is hence calibrated, in a known way, to measure, with the desired precision, the body temperature of a patient when the distance between the sensor (2) and the body (p) of the patient has the aforesaid value (d) or (d'). The mode of operation of the thermometer (1) (at a distance or by contact) can be selected by the operator using a switch (or other functionally equivalent means) schematically indicated by (14) in FIGS. 1 and 2.

A measurement by contact may be advantageous if compared to a measurement at a distance when the environmental conditions (e.g., very ventilated and/or very hot or very cold conditions) could affect the precision and/or reliability of a measurement at a distance. In a clinical/hospital field, it may be considered useful and/or advantageous to be able to confirm, through a measurement by contact, the result of a measurement at a distance (or vice versa) when the body temperature of a patient measured through the former measurement is unexpectedly high or low, or else when it is higher than a preset value $T_0$.

Figure 3:
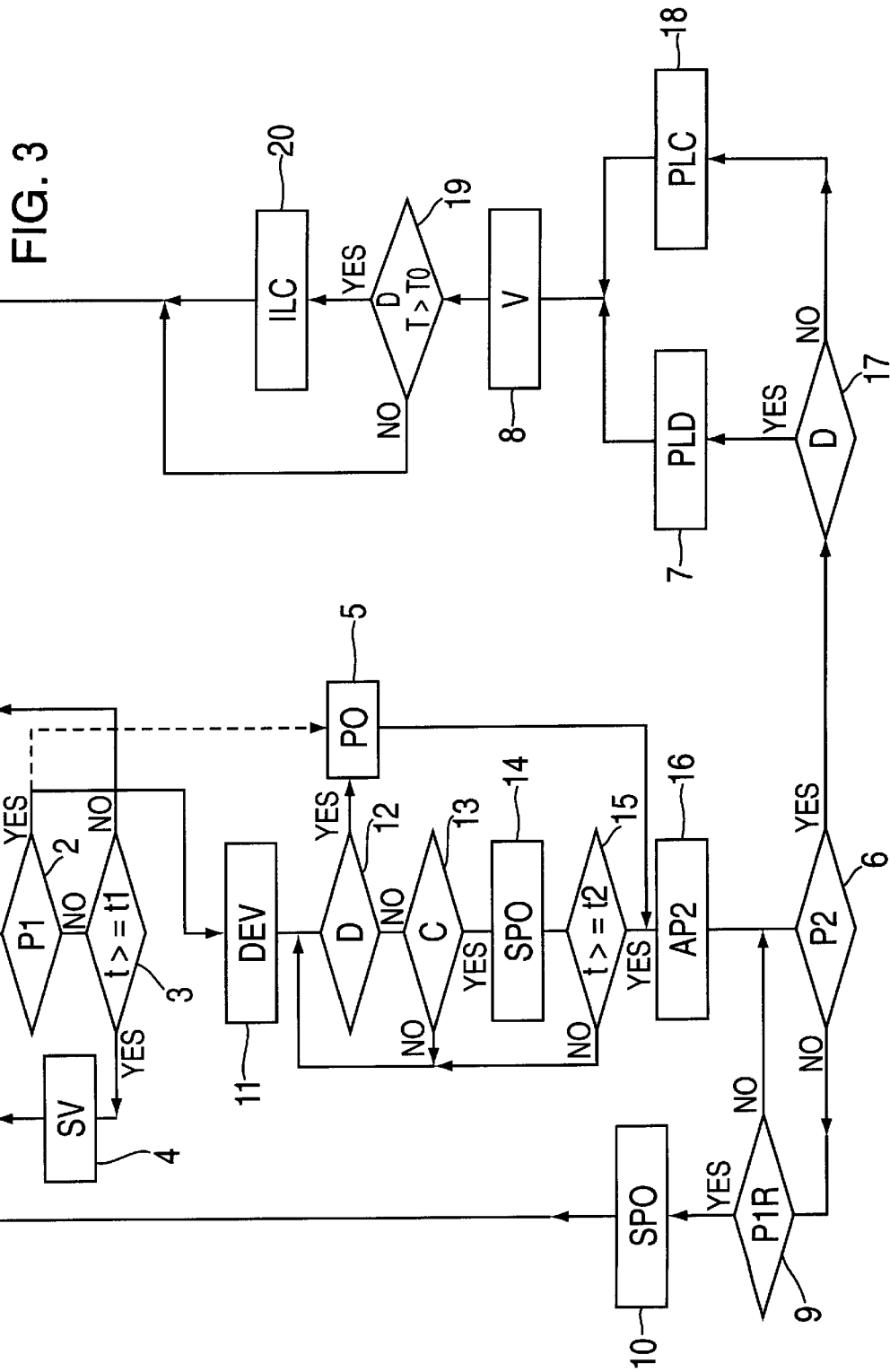

FIG. 3 is a schematic representation of a flow chart illustrating the operation of a logical unit (3) belonging to a thermometer (1). First of all the operation will be illustrated of a logical unit (3) belonging to a thermometer (1) able to carry out only measurements at a distance; subsequently, this description will be integrated with that of the further functional steps carried out by the logical unit (3) of a thermometer (1) suitable for making also measurements by contact.

When the thermometer (1) is activated, the logical unit (3) performs (phase 1) possible self-diagnostics procedures, and checks (phase 2) whether the first push-button (10), which activates the optical aiming system, has been pushed. If the first push-button (10) has not been pushed, the logical unit (3) checks (phase 3) whether a preset deactivation time $t_1$ has elapsed (e.g., 30 seconds) before switching off (phase 4) the display (4), if this was on, and checks again (phase 2) whether the first push-button (10) has been pushed.

This condition (return to phase 2) will be hereinafter referred to as "return to wait state".

If the first push-button (10) has been pushed (phase 2), the logical unit (3) activates (phase 5; in FIG. 3 this passage is schematically indicated by a dashed line) the optical aiming system, enables (phase 16) operation of the second push-button (11) and, after verifying (phase 6) that the second push-button (11) has been pushed, activates (phase 7) the procedure (not described herein because it is in itself known) for temperature measuring at a distance, and switches on (phase 8) the display (4) to display for a preset period of time the temperature measured before returning to the wait state.

If the second push-button (11) has not been pushed, the logical unit (3) checks (phase 9) that the first push-button (10) has been released before switching off (phase 10) the optical aiming system and returning to the wait state; otherwise, it checks again (phase 6) whether the second push-button (11) has been pushed. If the thermometer (1) is able to carry out also measurements by contact, it includes also the switch (14), and the logical unit (3) is able to perform at least the following further functional steps:

if the first push-button (10) has been pushed (phase 2), the logical unit (3) acquires (phase 11) the position of the switch (14): if the switch (14) is positioned on "measurement at a distance" (phase 12), the logical unit (3) activates (phase 5) the optical aiming system and enables (phase 16) operation of the second push-button (11); otherwise, it checks (phase 13) whether the switch (14) is positioned on "measurement by contact";

if the switch (14) is positioned on "measurement by contact" (phase 13), the logical unit (3) disables (phase 14) the optical aiming system; otherwise, it checks again whether the switch (14) is positioned on "measurement at a distance" (phase 12);

once the optical aiming system has been disabled (phase 14), the logical unit (3) first verifies (phase 15) that a preset time interval $t_2$ (e.g., 8 seconds), necessary for stabilizing the internal temperature of the sensor (which might have changed on account of the previous measurement by contact), has elapsed since the previous measurement by contact, and then enables (phase 16) operation of the second push-button (11). If the preset time $t_2$ has not elapsed, the logical unit (3) checks again whether the switch (14) is positioned on "measurement at a distance" (phase 12);

if the second push-button (11) has been pushed (phase 6), the logical unit (3) checks (phase 17) whether the switch (14) is positioned on "measurement at a distance" before activating (phase 7) the aforesaid procedure for measuring temperature at a distance; otherwise, it activates (phase 18) a procedure (not described herein because it is in itself known and anyway similar to that for temperature measuring at a distance) for measuring the temperature by contact and switches on (phase 8) the display (4) to display for a preset period of time the temperature measured, before returning to the wait state.

In the embodiment illustrated in the flow chart of FIG. 3, after switching on (phase 8) the display (4) to display for a preset period of time the temperature measured, the logical unit (3) first verifies (phase 19) that the switch (14) is positioned on "measurement at a distance" and that the temperature measured is higher than the aforesaid preset value $T_0$, and then shows on the display (4) (phase 20) for a preset time a prompt to carry out a control measurement by contact before returning to the wait state; otherwise, it returns directly to the wait state.

Without departing from the scope of the invention, it is possible for a technician to make an optical aiming system, subject of the present description, all the modifications and improvements suggested by normal experience and by the natural evolution of techniques to the infrared thermometer comprising.

What is claimed is:

1. A clinical infrared thermometer comprising at least a sensor for detecting infrared radiation emitted by the patient, a logical unit for processing the signal emitted by said sensor, display means driven by said logical unit for displaying the body temperature of said patient measured by said thermometer, wherein, during measuring of said body temperature, said sensor is put at a preset distance from the body of said patient, determined by means of an optical aiming system belonging to said thermometer and comprising means for generating a pair of light rays and optical means that cause the aforesaid light rays to converge in a preset point, said optical means does not belong to said generating means, the distance of said preset point from said sensor being equal to said preset distance, said sensor, said logical unit, said display means, said means for generating said pair of light rays and said optical means being positioned inside the thermometer casing.

2. A thermometer according to claim 1, wherein said means for generating said pair of light rays include a light source, means for splitting the light ray emitted by said light source, and means for deflecting both said light rays coming out of said splitting means to make them converge in said preset point, said deflecting means being different from said splitting means and being suitable to reflect both the light rays generated by said splitting means.

3. A thermometer according to claim 2, wherein said splitting means and said deflecting means consist of optical prisms.

4. A thermometer according to claim 2, wherein said splitting means consist of an optical prism and said deflecting means consist of mirrors.

5. A thermometer according to claim 1, wherein said means for generating the said pair of light rays include a pair of light sources, equal to one other, located inside the thermometer casing at the sides of said sensor and inclined with respect to the axis of longitudinal symmetry of said thermometer, so as to cause the light rays emitted by said light sources to converge in the said preset point.

6. A thermometer according to claim 5, wherein each one of said optical means for causing said light rays to converge in the preset point consists of plane-convex or biconvex lenses.

7. A thermometer according to claim 1, wherein it further comprises a pair of push-buttons, the first of said push-buttons activating said optical aiming system, the second of said push-buttons activating said thermometer.

8. A thermometer according to claim 7, wherein said push-buttons, have a different mechanical response requiring a different pressure to be activated.

9. A thermometer according to claim 7, wherein said push-buttons, are operated through the same button.

10. A thermometer according to claim 1, wherein said logical unit carries out in order at least the following sequence of functional steps:

check whether the first push-button has been pushed;

if said first push-button has not been pushed, check whether a first preset deactivation time t1 has elapsed before turning-off said display means and return to wait state; otherwise activate said optical aiming system and enable operation of said second push-button;

if said second push-button has been pushed, activate the procedure for temperature measuring at a distance, switch on said display means to display the temperature measured for a preset period of time and return to the said wait state; otherwise check whether the said first push-button has been released;

if said first push-button has been released, switch off said optical aiming system and return to said wait state; otherwise, check again whether the said second push-button has been pushed.

11. A thermometer according to claim 10, able to perform also measurements by contact, wherein it comprises also a switch for enabling said thermometer to carry out, alternatively, measurements at a distance and measurements by contact, and in that the said logical unit carries out in order at least the following further functional steps:

if said first push-button has been pushed, acquire the position of said switch;

if said switch enables said thermometer to carry our measurements at a distance, activate said optical aiming system and enable operation of said second push-button; otherwise, check whether said switch is enabling said thermometer to carry out measurements by contact;

if said switch is enabling said thermometer to carry out measurements by contact, disable said optical aiming system; otherwise, check again whether said switch is enabling said thermometer to carry out measurements at a distance;

once said optical aiming system has been disabled, first verify that a second preset time interval t2 has elapsed since the previous measurement by contact, and enable operation of said second push-button;

if the said second preset time t2 has not elapsed since the previous measurement by contact, check again whether said switch is enabling said thermometer to carry out measurements at a distance;

if said second push-button has been pushed, check whether said switch is enabling said thermometer to carry out measurements at a distance before activating the said procedure for measuring temperature at a distance;

otherwise, activate the procedure for measuring the temperature by contact and switch of said display means to display for a preset period of time the temperature measured, before returning to the wait state.

12. A thermometer according to claim 11, wherein after switching on the said display means to display for a preset period of time said temperature measured, the said logical unit carries out at least the further functional steps of verifying that said switch is enabling said thermometer to carry out measurements at a distance and that the said temperature is higher than a preset value T0, and then showing on said display means for a preset time a prompt to carry out a control measurement by contact before returning to said wait state.

* * * * *